(12) United States Patent
Check

(10) Patent No.: US 6,169,270 B1
(45) Date of Patent: Jan. 2, 2001

(54) SEALED FOOD CONTAINER AND METHOD OF ENSURING DELIVERY OF THE CONTAINER IN A HEATED STATE

(76) Inventor: Robert Check, 446 Shrewsbury Dr., Clarkston, MI (US) 48348

( * ) Notice: Under 35 U.S.C. 154(b), the term of this patent shall be extended for 0 days.

(21) Appl. No.: 09/531,260

(22) Filed: Mar. 17, 2000

(51) Int. Cl.[7] .............................. H05B 3/36; A21B 1/52; G21K 13/00
(52) U.S. Cl. .......................................... 219/387; 374/150
(58) Field of Search .................................... 219/385, 386, 219/387, 506; 206/459.1, 459.5; 374/141, 149, 150

(56) References Cited

U.S. PATENT DOCUMENTS

| | | | |
|---|---|---|---|
| 4,156,365 | * 5/1979 | Heinmets et al. | 374/141 |
| 4,307,289 | * 12/1981 | Thomas et al. | 219/386 |
| 4,538,926 | * 9/1985 | Chretien | 374/150 |
| 4,717,710 | 1/1988 | Shimizu et al. . | |
| 4,878,588 | * 11/1989 | Ephraim | 374/150 |
| 4,919,983 | * 4/1990 | Fremin | 374/150 |
| 5,273,360 | * 12/1993 | Wyatt et al. | 219/386 |
| 5,720,555 | * 2/1998 | Elele | 374/150 |
| 6,018,143 | 1/2000 | Check . | |

OTHER PUBLICATIONS

Promo Edge Flyer from the internet http;//www.promoedge.com for "Opti–Therm" temperature sensitive ink.

* cited by examiner

*Primary Examiner*—Joseph Pelham
(74) *Attorney, Agent, or Firm*—Reising, Ethington, Barnes, Kisselle, Learman & McCulloch, P.C.

(57) ABSTRACT

A food container for carrying a heated food product that is provided with a seal which connects the lid of the container to the body portion thereof and visually indicates that the food container has been maintained in a heated condition.

16 Claims, 3 Drawing Sheets

SEALED FOOD CONTAINER AND METHOD OF ENSURING DELIVERY OF THE CONTAINER IN A HEATED STATE

FIELD OF THE INVENTION

This invention relates generally to containers for carrying a heated food product and more particularly concerns a sealed food container provided by a seal that is tampler proof and visually indicates that the container is in a heated state and also concerns a method of visually ensuring that the food container when transported from the place where it is prepared to the customer's door is in a heated condition.

BACKGROUND AND SUMMARY

My U.S. Pat. No. 6,018,143, entitled Heat Thermal Bag, issued on Jan. 25, 2000 discloses a portable heating container or thermal bag for carrying a food product such as a pizza. The thermal bag has top and bottom panels and is closed at the rear end and at the sides; but has an opening at the front for the insertion and removal of the food product. The bag is insulated and has a built-in heating device with a thermostat to maintain the bag at a desired temperature. The heating device is intended to be plugged into the cigarette lighter of the delivery vehicle so that the bag remains heated up to the point of actual delivery to the customer. Thus, the pizza or other food product in the bag will remain oven hot no matter what weather conditions, traffic conditions or delivery distance prevail. A thermofuse is employed to prevent overheating as might occur as a result of failure of the thermostat.

When properly used, the thermal bag described above will maintain a constant temperature of 160 degrees Fahrenheit to 175 degrees Fahrenheit so that the food product is maintained at a desired temperature while being transported from one location to another. If not properly used, however, the temperature of the thermal bag can drop resulting in the food product not being maintained at the desired temperature when delivered to the customer. This, of course, affects the quality of the food product and often creates an unhappy customer who may decide to no longer make any additional purchases from the party preparing and selling the food product.

Accordingly, one object of the present invention is to provide a new and improved seal for a food container that renders the food container tamper-proof and serves to visually indicate to a customer that the food container has been maintained in a heated state.

Another object of the present invention is to provide a new and improved portable food container for carrying a heated food product for delivery to a customer and in which the container is provided with a seal that will require the container to be maintained at a desired temperature.

A further object of the present invention is to provide a new and improved portable food container for heated food products that is provided with a seal which prevents tampering with the contents of the container and also serves to verify visually that the container is at or above a desired temperature.

A still further object of the present invention is to provide a new and improved method of transporting a heated food product in a portable food container from the place where the food has been prepared to the customer's door while maintaining the food container at a constant temperature and ensuring visually that the contents of the food container is at or above a desired temperature when given to the customer.

A still further object of the present invention is to provide a new and improved method of ensuring that a portable food container carrying a heated food product is not tampered with and is at a desired temperature after being transported by a motor vehicle from the store where it was prepared to a customer's door.

BRIEF DESCRIPTION OF THE DRAWINGS

Other objects, features and advantages of the present invention will become more apparent from the following detailed description of the invention when taken with the drawings in which.

DETAILED DESCRIPTION OF THE INVENTION

Figure 1:
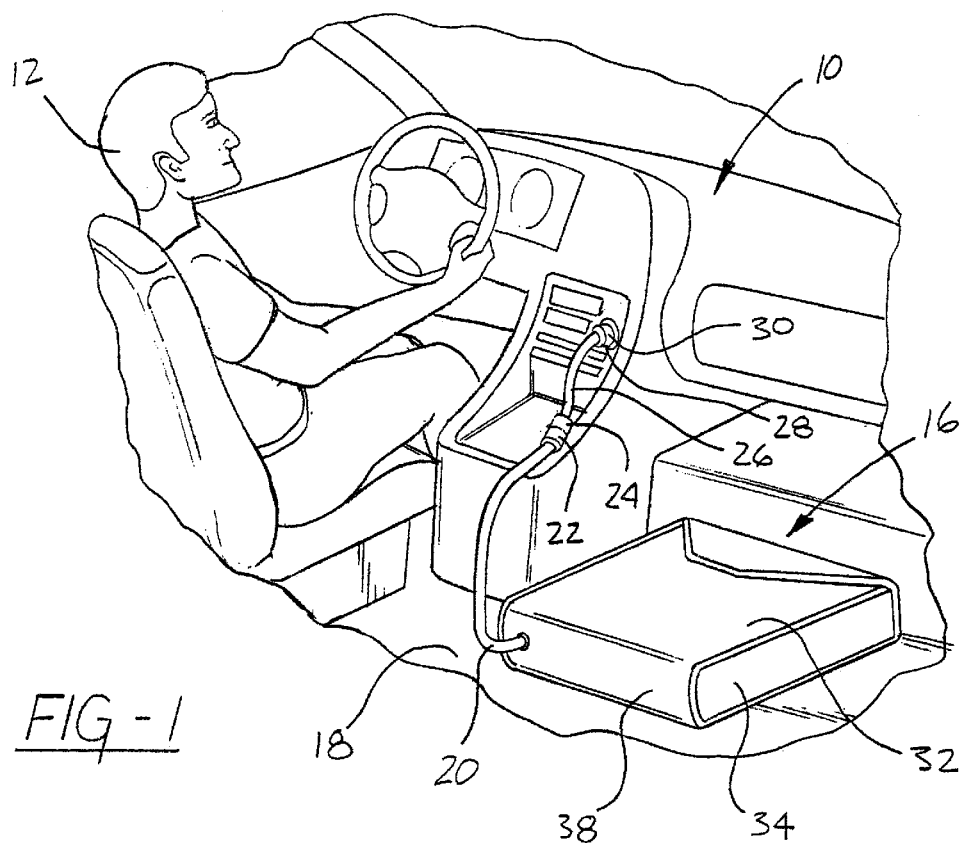
FIG. 1 is a perspective view of a front compartment of a motor vehicle provided with a portable heated container having a two removable food containers therein in accordance with the present invention with the heated container situated along side of a vehicle driver and being transported by a vehicle driver for delivery to a customer of the heated food products within the food containers.
Figure 2:
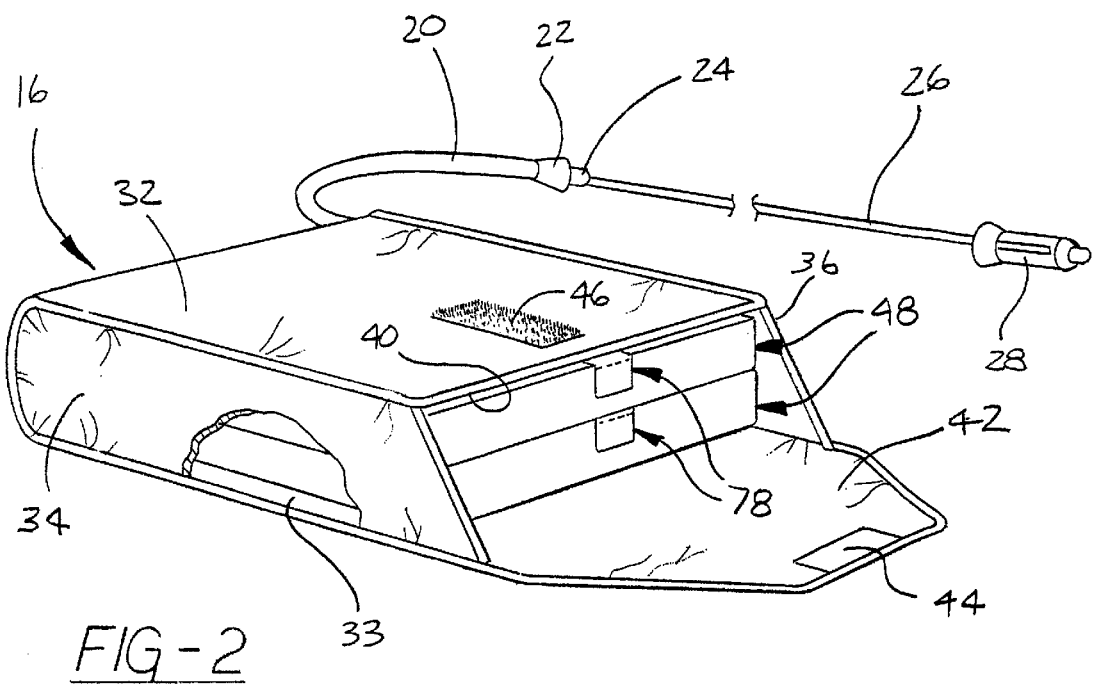
FIG. 2 is a perspective view of the portable heated container seen in FIG. 1 with its flap opened to reveal the two food containers.

Referring now to the drawings and more particularly to FIGS. 1 and 2 thereof, the front compartment of a motor vehicle 10, such as a van, is shown with a vehicle operator 12 seated behind the steering wheel 14 of the vehicle 10. In this case, the vehicle operator 12 serves as a delivery person of heated food products located within a portable thermal bag or heated container 16 that is shown positioned along side of the vehicle operator 12 and resting on the floor portion 18 of the vehicle 10. The heated container 16 includes an electric lead 20 attached to the rear of the heated container 16 that terminates with a quick release connector 22. The connector 22 is coupled to a mating connector 24 of a power cord 26 which has a plug 28 on the other end that is plugged into an electric outlet or receptacle such as the cigarette lighter 30 of the vehicle 10.

The heated container 16, seen in FIGS. 1 and 2, has a top panel 32 and a similar bottom panel 33 and includes side panels 34 and 36 that close the sides of the heated container 16. The heated container 16 is closed at the rear by a rear panel 38 and has an opening at the front that leads to a cavity 40 defined by the panels 32–38. A closure member or flap 42 is integrally formed with the bottom panel 33. As should be apparent, the flap 42 is foldable up over the top panel 32 to sealingly close the opening leading to the cavity 40. The flap 42 is held closed by cooperating strips of hook and loop fasteners 44 and 46, such as Velcro, on the inner surface of the flap 42 and on the outer surface of the top panel 32, respectively.

The panels 32–38 of the heated container 16 are preferably rectangular, as shown with the top and bottom panels 32 and 33 and the rear panel 38 being formed from one continuous multi-layer length of flexible material. Each of the panels 32–38 and the flap 42 are formed with an embedded flexible layer of insulation (not shown) for heat retention. In addition, the top and bottom panels 32 and 33 have a layer of resinous plastic material (not shown), such as polyurethane form, embedded therein with each layer of plastic material having an electric resistance wire (not shown) arranged in a serpentine manner and secured thereto by an adhesive. The resistance wire in each panel 32 and 33 serves as a heating element to keep the contents of the heated container 16 at a constant temperature range of 160 degrees Fahrenheit to 175 degrees Fahrenheit through a thermostat (not shown) located in the top panel 32. The resistance wires in the panels 32 and 33 are connected to the lead wire 20 attached to the rear of the heated container 16. A more detailed description of the construction of the heated container 16 can be found in my aforementioned U.S. Pat. No. 6,018,143 and reference is made thereto for this purpose.

Figure 3:
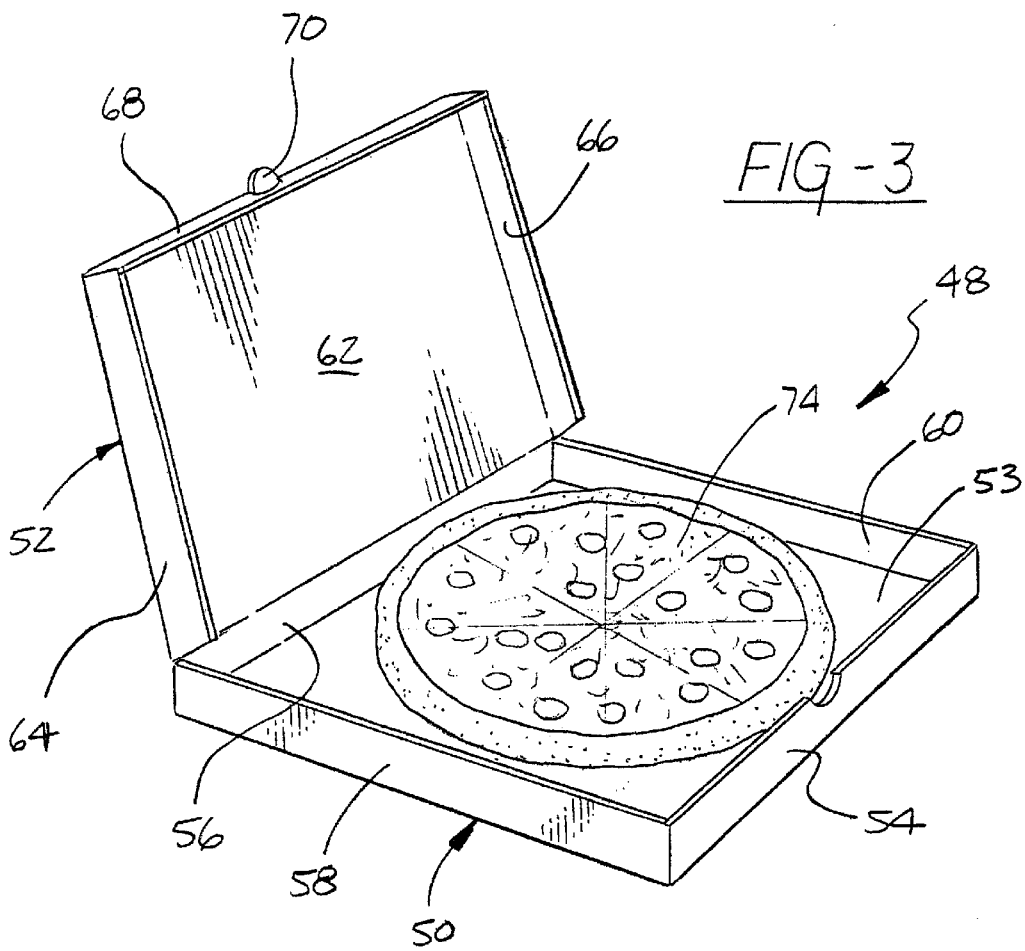
FIG. 3 is a perspective view of one of the food containers seen in FIG. 2 having its lid in the open position to reveal the heated food product.
Figure 4:
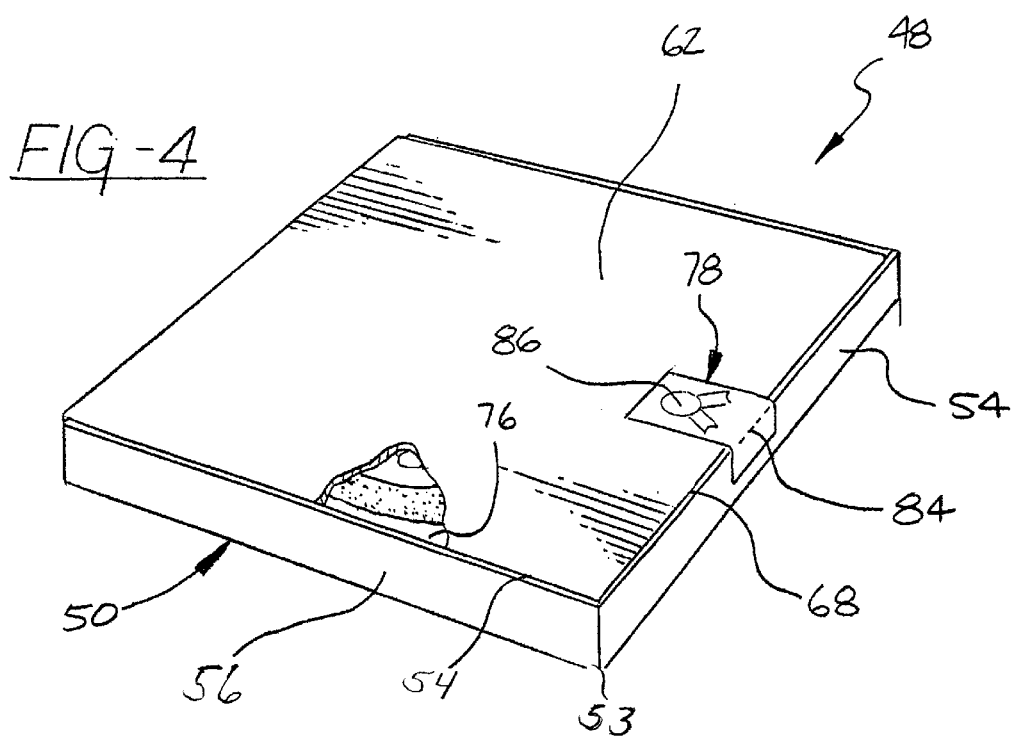
FIG. 4 is a perspective view of the food container seen in FIG. 3 having its lid closed and joined to the body portion of the food container by a seal containing a heat sensitive coating on an indicia that serves to visually indicate whether the food container is at a desired temperature.

As seen in FIG. 2, two identical rectangular food containers 48, each in the form of a box, are located within the cavity 40 of the heated container 16. As seen in FIGS. 3 and 4, each of the food containers 48 includes a rectangular body portion 50 provided with a hinged lid 52, both of which are made of cardboard. The body portion 50 of the food container 48 includes a rectangular base section 53 integrally formed with upstanding front and rear walls 54 and 56, respectively, and a pair of laterally spaced upstanding side walls 58 and 60. The lid 52 has a rectangular top section 62 integrally formed with a pair downward depending laterally spaced side walls 64 and 66 and a front wall 68. A centrally located tab 70 is cut out of the front wall 68 and is used to facilitate opening and closing of the lid 52. In addition, the lid 52 is hingedly connected to the rear wall 56 of the body portion 50 of the food container 48 at a score line 72 extending the length of the rear wall 56. Accordingly, the lid 52 is adapted to be folded downwardly about the score line 72 to a closed position wherein the side walls 64 and 66 and the front wall 68 of the lid 52 are located, as seen in FIG. 4, within the confines of the body portion 50 adjacent the side walls 58 and 60 and front wall 54. Food containers of this type are typically used for accommodating a heated pizza 74 as shown in FIG. 3. Once the lid 52 is closed, the hot pizza 74 is located in a closed rectangular chamber 76, the inner air of which becomes heated due to the heat loss of the pizza 74. The insulating properties of the cardboard, although limited to some extent, serve to prevent the heat in the chamber 76 from being rapidly dissipated. Various pizza companies such as Pizza Hut, Little Caesars, and Domino's as well as various "Mom and Pop" stores utilized a food containers of the above-described type for holding a heated pizza.

Figure 5:
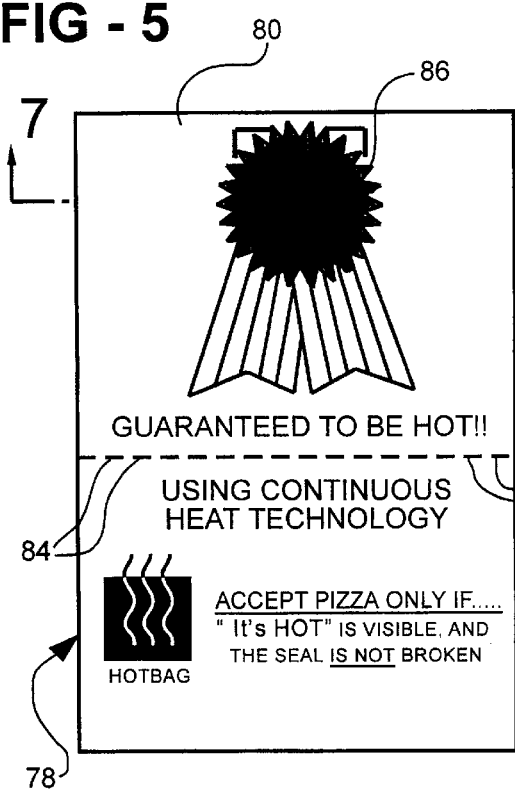
FIG. 5 is an enlarged view of the seal applied to the food container seen in FIG. 4 showing the condition of the heat sensitive coating when it is at a temperature below a predetermined temperature.
Figure 6:
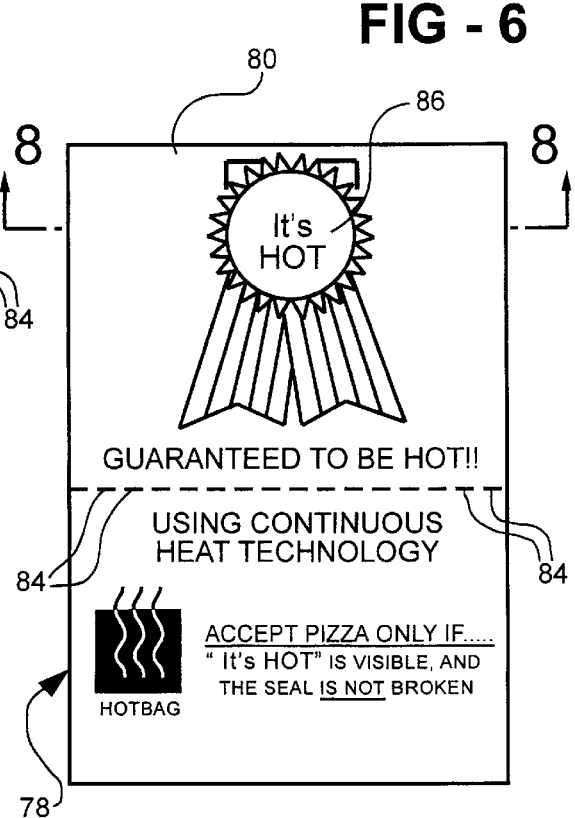
FIG. 6 is a view of the seal seen in FIG. 5 showing the condition of the heat sensitive coating when it is at or above a predetermined temperature.
Figure 7:
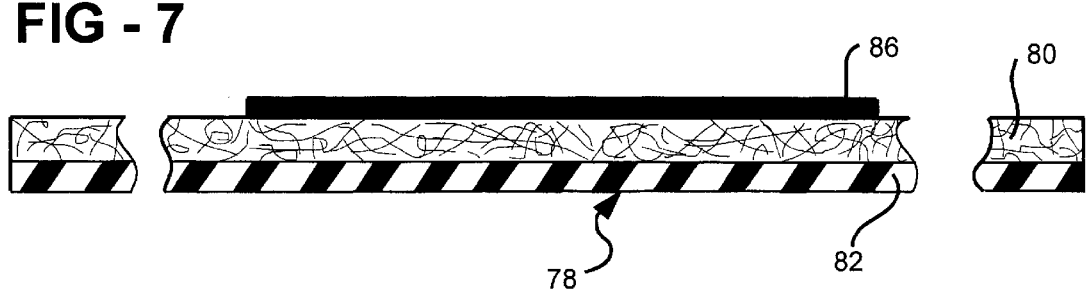
FIG. 7 is an enlarged sectional view of the seal taken on line 7—7 of FIG. 5.
Figure 8:
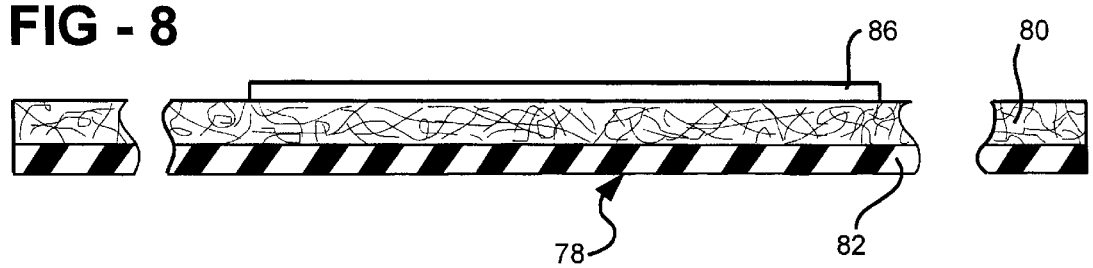
FIG. 8 is an enlarged sectional view of the seal taken on line 8—8 of FIG. 6.

Although food containers of the above-described type provide some heat retention for a food product such as the heated pizza 74, there are some pizza stores that prolong the heat retention by placing the food container 48 under a heat lamp prior to pick-up by a customer. However, it has been found that in cases where the food container must be transported to a customer's door, the cardboard of the food container 48 has insufficient insulating properties to be capable of maintaining the food product at a desired temperature. For ties reason, it is becoming quite common for the food containers to be placed in the portable heated container 16 as seen in FIG. 2. However, as alluded to hereinbefore, if the heating container 16 is not use properly, the temperature within the cavity 40 can drop. As a result, the food container 48 and, as a consequence the food product, may not be maintained at a desired temperature. In an effort to prevent this from occurring, the food container 48 is provided with a seal 78 having a substrate 80 in the form of a rectangular sheet preferably made of sixty pound white semi-gloss paper. As seen in FIGS. 5 and 6, the front side of the substrate 80 has certain words printed thereon regarding temperature and indicating that the pizza 74 should only be accepted if the words "It's HOT" are visible. In addition, on the backside of the substrate 80, pressure sensitive adhesive is coated thereon, as seen in FIGS. 7 and 8, that serves to securely join or connect the front wall 54 of the body portion 50 of the food container 48 to the top section 62 of the lid 52. The substrate 80 of the seal 78 is also provided with a plurality of straight line perforations 84 which, when the seal 78 is applied on the food container 48, are aligned with the intersection of the front wall 54 with the plane of the top section 62 as seen in FIG. 4. Moreover, the substrate 80 of seal 78 is provided with a localized circular heat sensitive coating 86 over the words "It's HOT". This heat sensitive coating 86 is opaque, as seen in FIGS. 5 and 7, when it is below a predetermined temperature and the heat sensitive coating 86 is clear, as seen in FIGS. 6 and 8, to reveal the words "It's HOT" when it is at or above a predetermined temperature. The heat sensitive coating 86 is made of a reversible thermochromic composition which, upon being heated to a predetermined temperature, changes from the opaque colored state of FIGS. 5 and 7 to the colorless state of FIGS. 6 and 8 to expose the words "It's HOT" as seen in FIG. 6.

The heat sensitive coating 86 on the seal 78 is available from a company known as Promo Edge, which is a division of Menasha Corporation, and is located at 950 Breezewood Lane, P.O. Box 427, Neenah, Wis. 54957-0427. Promo Edge identifies the heat sensitive coating 86 as a "Clearing Temperature Sensitive Ink". The particular "Clearing Temperature Sensitive Ink" used in making the heat sensitive coating 86 is identified by Promo Edge as Type 45 ink. By experimentation, I found that the Type 45 ink provides a temperature range which would be acceptable for maintaining the food container 48 within the heated container 16 at a desired temperature upon delivery to a customer. The Type 45 ink allows the opaque color to appear on the substrate 80 when the temperature is at or below 104 degrees Fahrenheit and permits the opaque color to completely disappear to fully reveal the words "It's HOT" when the temperature is at or above 122 degrees Fahrenheit. Between the two temperatures, there is a gradual change from the opaque color to the clear color. Moreover, once the temperature of the Type 45 ink is at or above 122 degrees Fahrenheit, it continues to display clearly the words "It's HOT" for a period of about four to five minutes after the food container 48 has been removed from the heated container 16 and the seal 78 is exposed to a room temperature of approximately 72 to 75 degrees Fahrenheit.

It will be noted that other inks, such as Type 47 or Type 60, are available from Prom Edge that may be substituted for the Type 45 ink if it is desired to have the heat sensitive coating 86 change from an opaque color to a clear color at higher temperature rangers. The Type 47 is opaque at or below 111.2 degrees Fahrenheit and is completely clear at or above 136.4 degrees Fahrenheit while the Type 60 ink is opaque at or below 127.4 degrees Fahrenheit and is completely clear at or above 149 degrees Fahrenheit. In addition, a thermochromic composition for providing a color change of the type experienced by the inks referred to above can be found discussed in the U.S. Pat. No 4,717,710 entitled "Thermochromic Composition ", issued on Jan. 5, 1988 in the name of Shimizu et al.

The adhesive 82 that has been found to provide excellent adhesion with the cardboard of the food container 48 can also be obtained from Promo Edge and is made by Spinnaker Coating, Inc. of Troy, Mich. 45373 and is identified as Spinnaker Coating BP-52. The adhesive 82 is an aggressive, acrylic general purpose permanent pressure sensitive adhesive which offers excellent bond permanency to cardboard and a wide variety of packaging materials. Accordingly, once placed on the food container 48, the seal 78 cannot be removed without leaving evidence that it has been removed. Thus, if someone should try to tamper with the food product within the food container 48, it will be evident by the condition of the seat 78.

In practicing the present invention and using the pizza 74 as an example of a food product, the pizza 74 is initially baked and removed from the oven and placed on a cutting board. While on the cutting board, the pizza 74 is a at a temperature of approximately 200 degrees Fahrenheit. The pizza 74 is then pre-cut into pie-shaped pieces and immediately placed within the food container 48 as seen in FIG. 3 after which the lid 52 is closed. Once the lid 52 is closed, some of the heat from the hot pizza will be transferred by to the air within the chamber 76 and as well as to the food container 48 in its entirety by a combination of convection and conduction. At this point the seal 78 is applied to the front end of the food container 48, as seen in FIG. 4, with the perforations 84 thereof being aligned along the intersection of the front wall 54 and the plane of the top section and thereby provide a tear line for opening the lid 52. When so positioned, the circular heat sensitive coating 86 is located in a conspicuous place on the outer surface of the top section 62 of the lid 52 approximately one and one half to two inches from the intersection of the front wall 54 and the plane of the top section 62. At this stage, if the top section 62 of the lid at the location of the heat sensitive coating 86 has been heated to a temperature of 122 degrees Fahrenheit or higher, the heat sensitive coating 86 will be completely clear to expose the words "It's HOT". It will be noted that during the time that the pizza was prepared and placed into the food container 48, the lead wire 20 of the heated container 16 has been plugged into a HOTBAG Power Distribution Unit (PDU) (not shown in the accompanying drawing). The PDU supplies electrical energy to the resistance wires of the panels 32 and 33 to provide a temperature in the range of 160 degrees Fahrenheit to 175 degrees Fahrenheit within the cavity 40 of the heated container 16. The PDU and a rack for holding six heated containers 16 is available as an in-store holding system from Check Corporation, 1394 Piedmont, Troy, Mich. 48083. The Check Corporation identifies such system as a 6-PACK Pizza Delivery System which includes the rack and incorporates the PDU and six output cables which connect with the connector 22 of the six heated containers 16 for keeping twelve pizzas hot and ready for pick up or delivery.

After applying the seal 78 to the food container 48, the flap 42 of the heated container 16 is opened and the food container 48 is placed into the cavity 40 after which the flap 42 is resealed by having the Velcro strips 44 and 46 reconnected. The food container 48 may be the first container placed into the cavity 40 or the cavity 40 may already have within it another food container 48 as seen in FIG. 2. If the latter is the case and as seen in FIG. 2, inasmuch as the temperature within the cavity 40 is being maintained in the aforementioned range of 160 degrees Fahrenheit and 175 degrees Fahrenheit, the other food container 48 will be sufficiently elevated in temperature so that the heat sensitive coating 86 thereon will be clear to expose the words "It's HOT. Also, when the second food container 48 is placed in to the cavity 40, the base section 53 of the second food container 48 will rest upon and cover the heat sensitive coating 86 of the seal 78 on the first food container 48 and, through conduction, also serve to transfer heat from its base section 53 to the heat sensitive coating 86 of the first-to-enter food container 48 within the cavity 40.

Afterwards, the food containers 48 within the heated container 16 that have to be delivery to the door of a customer will be removed from the support rack by the vehicle operator 12 who will also disconnect the quick release connector 22 from the PDU. The heated container 16 will then be placed into delivery vehicle, and the connector 22 will be connected to the power cord 26 and the plug 28 plugged into the cigarette lighter 30 as seen in FIG. 1. By so doing, the temperature within the cavity 40 of the heated container 16 will be continuously maintained at the desired temperature which will be evidenced by the heat sensitive coating being clear and revealing the words "It's HOT". When the vehicle operator 12 arrives at his destination, one or both of the food containers 48 will be removed from the cavity 40 of the heated container 16 and handed to the customer. The customer can immediately observe visually that the words "It's HOT" appearing on the seal 78. This will verify that the food container 48 and the pizza were continuously maintained at a desired temperature from the time that the pizza 74 was placed in the food container 48 until it reached the customer's door. In addition, inasmuch as the seal 78 serves to join the body portion 50 of the food container 48 to the lid 62 thereof and cannot be removed without it be evident that it has been removed, the customer can rest assured that the pizza was not tampered with from the time it was placed into the food container 48 up until the customer received it.

Various changes and modifications can be made to the improved heated food container and the method described above without departing from the spirit of the invention. For example, the seal 78 can be made so that the words "It's HOT" covered by the heat sensitive coating 86 are located closer to the center of the top section of the food container 48 while still maintaining the tear perforations 84 at the aforementioned intersection of the lid 52 with the body portion 50. Also, the shape of the seal 78 need not be rectangular as shown but could take on other forms such as being square, triangular or circular. In addition, the temperature range indicated above for the heat sensitive coating 86 may be varied the important consideration being that the food product is delivered to the customer at a temperature of 140 degrees Fahrenheit or higher. Such and other changes and modifications are contemplated by the inventor and he does not wish to be limited except by the scope of the appended claims.

What is claimed is:

1. A seal for a food container having a body portion supporting a heated food product and said seal serving to visually indicate to a customer that said food container has been maintained in a heated condition, said food container adapted to be maintained in said heated condition by a heating device which provides heat within a first temperature range, said body portion having a lid hinged thereto that is adapted to be moved to a closed position to form a closed chamber for said heated food product, said seal including a substrate having a pressure sensitive adhesive on one side thereof and an indicia on the other side thereof that is covered by a heat sensitive coating and that visually indicates said heated condition, said heat sensitive coating being an opaque color so as to conceal said indicia when said heat sensitive coating is at or below the lowest temperature of a second temperature range, said heat sensitive coating being completely clear to visually expose said indicia when said heat sensitive coating is at or above the highest temperature of said second temperature range, said substrate of said seal adapted to connect said lid to said body portion through said adhesive when said lid is in said closed position, and said substrate of said seal having a plurality of closely aligned perforations formed therein, said perforations adapted to be located at the intersection of said lid and said body portion when said lid is in said closed position and serves to provide a tear line so as to facilitate the opening of said lid.

2. A sealed food container having a body portion supporting a heated food product that is maintained by a heating device at a desired temperature within a first temperature range for delivery to a customer in a visually verifiable heated state, a lid hinged to said body portion and adapted to be moved to a closed position to form a closed chamber for said food product, a seal including a substrate having a pressure sensitive adhesive on one side thereof and an indicia on the other side thereof that indicates said heated state and is covered by a heat sensitive coating, said heat sensitive coating having an opaque color so as to conceal said indicia when said heat sensitive coating is at or below the lowest temperature of a second temperature range, said heat sensitive coating being a clear color to visually expose said indicia when said heat sensitive coating is at or above the highest temperature of said second temperature range, said substrate of said seal connecting said lid to said body portion through said adhesive when said lid is in said closed position so that said indicia is located in a conspicuous place on said food container and thereby is readily visible when said food container is delivered to said customer, the arrangement being such that the lowest temperature of said first temperature range is at a higher level than the highest temperature of said second temperature range whereby sufficient heat is provided by said heating device to cause said heat sensitive coating to be in a clear state and expose said indicia while said food container is maintained at said desired temperature by said heating device and for a predetermined time period after said food container is no longer heated by said heating device.

3. The sealed food container set forth in claim 2 herein said substrate of said seal has a plurality of closely aligned perforations located to the front end of said food container at the intersection of said lid and said body portion when said lid is in said closed position, said perforations providing a tear line to facilitate opening of said lid.

4. The sealed food container set forth in claim 2 wherein said indicia is located on the outer surface of said lid when said lid is in the closed position.

5. The sealed food container set forth in claim 2 wherein said adhesive on said seal prevents said seal from being removed from said food container without leaving evidence that tampering of the food container has occurred.

6. In combination, a portable heated container having a cavity adapted to be closed by a closure member and to be transported by a motor vehicle from one location to another, an electric receptacle in said motor vehicle, a heating device incorporated in said heated container for heating said cavity to a temperature within a first temperature range, a food container adapted to be located within said cavity and to be maintained by said heating device in a heated state, said food container having a body portion for supporting a heated food product, a lid hinged to said body portion and adapted to be moved to a closed position to form a closed chamber for said food product, a seal having a substrate provided with a pressure sensitive adhesive on one side thereof and an indicia on the other side thereof that is covered by a heat sensitive coating and that indicates said heated state, said heat sensitive coating having an opaque color so as to conceal said indicia when at the lowest temperature of a second temperature range and to change to a clear color to visually expose said indicia when said heat sensitive coating is at or above the highest temperature of said second temperature range, said substrate of said seal fixedly connecting said lid to said body portion through said adhesive and having said indicia located in a conspicuous place on said food container so as to have said indicia readily visible when said food container is removed from said cavity, and said electric heater having a plug adapted to be connected to said receptacle in said motor vehicle to heat and maintain said cavity at a temperature within said first temperature range, the arrangement being such that the lowest temperature of said first temperature range is at a higher level than the highest temperature of said second temperature range whereby sufficient heat is provided in said cavity by said heating device to cause said heat sensitive coating to be in a clear state and expose said indicia while said food container is in said heated container and for a predetermined time period after said food container is removed from said heated container.

7. The combination set forth in claim 6 wherein said seal has a plurality of aligned perforations which are adapted to be located at the intersection of said lid with said body portion so as to facilitate the opening of said lid.

8. The combination set forth in claim 6 wherein said heated container includes top and bottom panels each of which has said electric heat element incorporated therein for providing said heating device.

9. The combination set forth in claim 6 wherein said indicia is located on the outer surface of said lid when said lid is in the closed position.

10. A method of ensuring that a food container having a heated food product therein is delivered to a customer in visually verifiable heated state, said food container having a body portion and a lid hinged thereto, said method comprising the steps of:

heating said food product to a predetermined temperature and placing said heated food product in said body portion and closing said lid to form a closed heated chamber for said food product;

providing a heating device for heating said food container to a desired temperature within a first temperature range, providing a seal which includes a substrate having a pressure sensitive adhesive on one side thereof and an indicia on the other side thereof that is covered by a heat sensitive coating which is opaque so as to conceal said indicia when said heat sensitive coating is at or below the lowest temperature of a second temperature range and which is completely clear to expose the indicia when said heat sensitive coating is at or above the highest temperature of said second temperature range, said highest temperature of said second temperature range being less than the low temperature of said first temperature range, placing said substrate of said seal on said food container so that said pressure sensitive adhesive connects said lid to said body portion and positions said indicia in a readily observable place on said food container, and applying heat from said heating device to said food container so as to maintain said food container at said desired temperature within said first temperature range whereby said heat sensitive coating visually exposes said indicia when said food product is delivered to said customer and continues to expose said indicia for a predetermined time period after said heating device no longer provides said heat to said food container.

11. The method set forth in claim 10 wherein said substrate of said seal has a plurality of aligned perforations located close to each other so as to provide a tear line that allows said lid to be opened, said perforations being positioned at the intersection of said lid with said body portion at the front end of said food container when said substrate is placed on said food container.

12. The method set forth in claim 10 wherein said indicia indicates that said container is hot.

13. A method of visually ensuring that a food container having a heated food product therein and being transported by motor vehicle is delivered to a customer in a heated state, said method comprising the steps of:

providing a portable heated container having a cavity and including a heater for heating said cavity to a desired temperature within a first temperature range, providing a portable food container having a body portion and a lid hinged thereto, heating said food product to a predetermined temperature and placing said heated food product in said body portion and closing said lid to form a closed chamber for said heated food product, providing a seal having a substrate provided with a pressure sensitive adhesive on one side thereof and an indicia on the other side thereof, said indicia indicating said heated state and being covered by a heat sensitive coating which is opaque so as to conceal said indicia when said heat sensitive coating is at or below the lowest temperature of a second temperature range and is completely clear to visually expose said indicia when said heat sensitive coating is at or above the highest temperature of said second temperature range, maintaining said first temperature range at a level wherein the lowest temperature of said first temperature range is higher than the highest temperature of said second temperature range, applying said substrate of said seal to said food container so that said pressure sensitive adhesive connects said lid to said body portion and locates said indicia in a conspicuous place on said food container, and placing said food container into said cavity of said heated container for maintaining said food container at said desired temperature within said first temperature range so that said heat sensitive coating visually exposes said indicia while said food product is located in said cavity and is being transported for delivery to said customer and continues to expose said indicia for a predetermined time period after said food container is removed from said cavity.

14. The method set forth in claim 13 wherein said motor vehicle has an electric receptacle and said heated container incorporates an electric element connected to a plug for heating said cavity, and wherein said plug is connected to said electric receptacle for maintaining said cavity of said heated container at said desired temperature within said first temperature range.

15. The method set forth in claim 13 wherein said seal is applied to said food container so that said indicia is located on the outer surface of said lid.

16. The method set forth in claim 13 wherein said seal has a plurality of perforations located close to each other so as to provide a tear line that allows said lid to be opened, and applying said seal to said food container whereby said tear line is at the intersection of said lid with said body portion at the front end of said food container.

* * * * *